Figure 1:
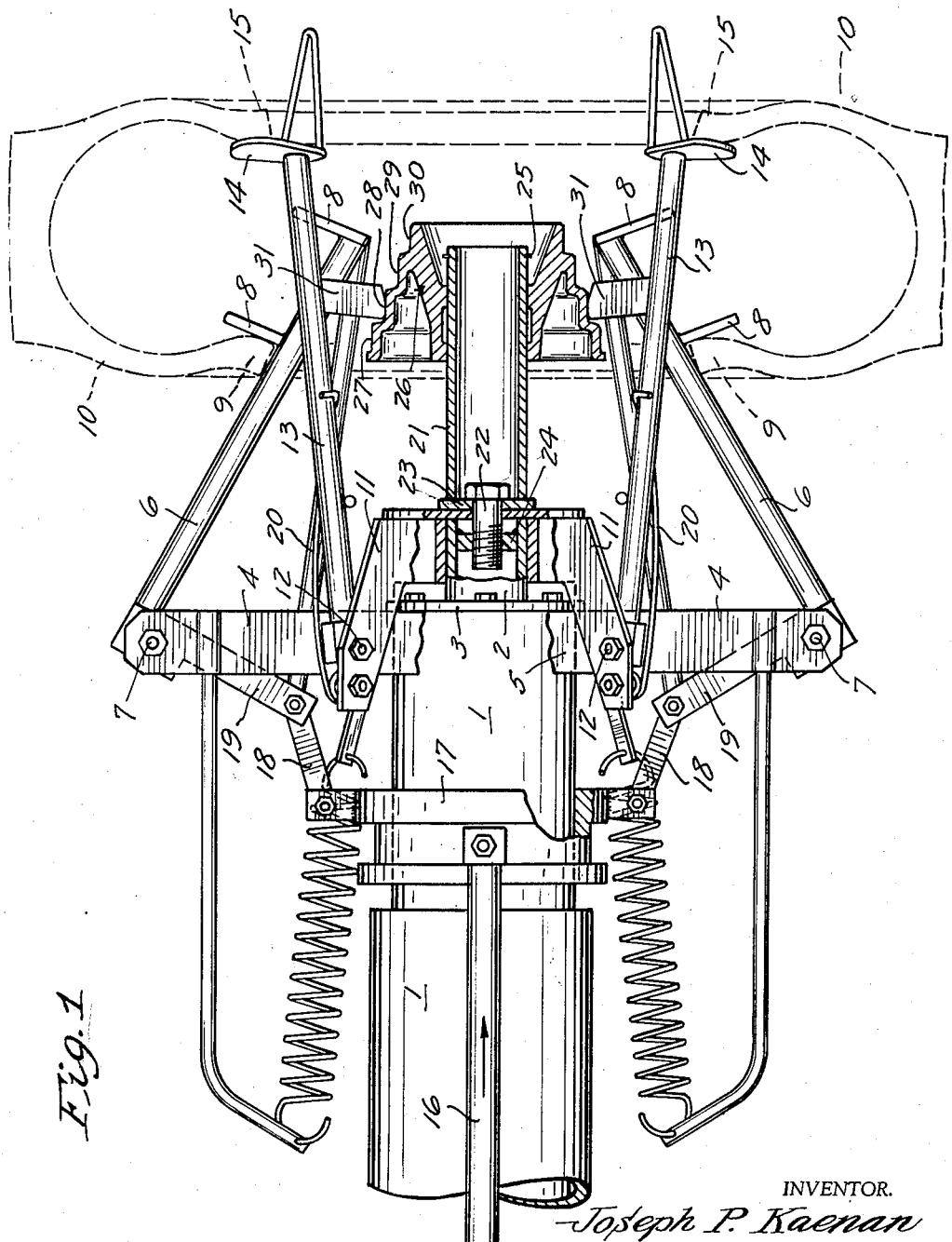

Dec. 29, 1959 J. P. KAENAN 2,919,105
TIRE SPREADER STRUCTURE
Filed Feb. 24, 1958 2 Sheets-Sheet 2

INVENTOR.
Joseph P. Kaenan
BY
Merchant & Merchant
ATTORNEYS

United States Patent Office 2,919,105
Patented Dec. 29, 1959

2,919,105

TIRE SPREADER STRUCTURE

Joseph P. Kaenan, Akron, Ohio, assignor to Branich Manufacturing Company, Inc., Fargo, N. Dak., a corporation of North Dakota Application February 24, 1958, Serial No. 717,235

3 Claims. (Cl. 254—50.3)

My invention relates to spreaders for pneumatic tire casings and more particularly to improvements in spreaders of the type broadly disclosed in Patent 1,908,311 wherein the spreader arms work through the opening defined by the rim engaging beads of the tire casing.

Tire spreaders of the above type include axially spaced inner and outer cooperating spreader arms and are uniformly utilized to reduce tire casings in diameter in order to place same into and remove same from unbroken tire retreading matrixes, all in accordance with the methods disclosed in Patent 1,917,261 (Re. 21,956). Not infrequently, under conditions wherein extreme spreading action is required the axially outer spreader arms carried by the piston are cammed in a radially inward direction by the bead and adjacent side wall portions of the tire casing engaged thereby so as to become completely dislodged from engagement with the beads.

The primary object of my invention is the provision of novel means whereby said axially outer spreader arms may be positively held against such radially inward movements during spreading action.

A further object of my invention is the provision of a device of the class immediately above described in which the cooperating portions of said spreader arms comprise radially inwardly projecting lugs carried by said spreader arms.

A still further object of my invention is the provision of a device of the class immediately above described in which said improvement comprises a stepped collar mounted on said head for axial sliding movements and defining a plurality of axially spaced cylindrical surfaces of progressively smaller diameter from one end to the other thereof and concentric with the axis of said piston and cylinder, said lugs being selectively engageable with said cylindrical surfaces and limiting radially inward movement of said spreader arms when a given one of said surfaces is positioned radially inwardly of said lugs.

A further object of my invention is the provision of a device of the class immediately above described in which the axially spaced cylindrical surfaces of said collar limit radially inward movement of the outer spreader arms beyond the rim size of a tire casing being spread thereby.

A still further object of my invention is the provision of a device of the class above described which is extremely inexpensive to produce, which is rugged and durable in construction, highly efficient in its operation, and which may be readily attached to tire spreaders of the class above described.

The above and still further objects of my invention will become apparent from the following detailed specification, appended claims and attached drawings.

Figure 2:
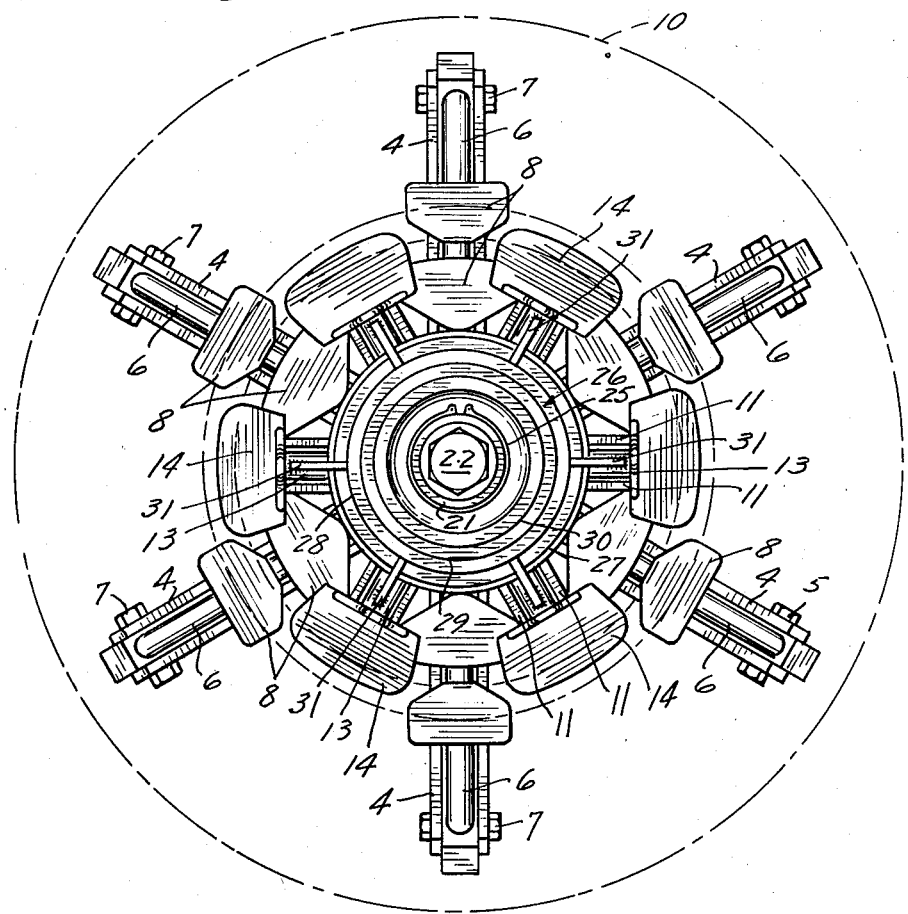

Referring to the drawings wherein like characters indicate like parts throughout the several views:

Fig. 1 is a fragmentary view partly in side elevation and partly in axial section of a conventional tire spreader showing my novel improvement; and Fig. 2 is a view in front elevation of the structure of Fig. 1.

Referring with greater particularity to the drawings, the numeral 1 indicates a horizontally disposed cylinder having a piston 2 working out of its forward end 3. Circumferentially spaced radial arms 4 project from an annular collar 5 carried by the cylinder 1. A plurality of circumferentially spaced spreader arms 6 are pivotally secured at their inner ends, as indicated by the numeral 7, to the radially outwardly projected end portions of the radial arms 4. The free ends of the arms 6 are provided with hooks or pads 8 adapted to engage the inner bead portions 9 of a tire casing 10.

Suitably mounted on the projected free end of the piston 2 are a plurality of circumferentially spaced radial arms 11 to the radially outer end portions of which, as indicated by the numeral 12, are pivotally secured the inner ends of spreader arms 13. The outer end portions of the spreader arms 13 are provided with pads 14 for the engagement of circumferentially spaced portions of the outer bead 15 of the tire casing 10. Thus, the spreader arms 6 and 13 provide cooperating pairs of inner and outer spreader arms respectively, the pad-equipped outer ends of which are mounted for swinging movements toward and away from the projected axis of the cylinder and piston 1, 2. The inner spreader arms 6 are positively held in engagement with the inner tire bead 9 by means of a ratchet-equipped treadle, not shown, which moves a push rod 16 outwardly as indicated by the arrow in Fig. 1, whereby to move outwardly a collar 17 mounted for axial sliding movements on the cylinder 1. Links 18 interposed between the collar 17 and the lower end of a rigid arm 19 on each of the spreading arms 6 transfer outward movements of the collar 17 to outward swinging movements of the pad-equipped spreader arms 6. Due to this construction, bead-engaging pads 8 associated with the inner spreader arm 6 never become disengaged from the inner bead portions 9 of the tire 10 during even the most extreme spreading movements. However, this is not the case, as above indicated, with the pads 14 associated with the outer spreader arms 13. It will be noted that torsion springs 20 bias said arms in a radially outward direction with respect to the projected axis of the cylinder 1. However, the yielding bias exerted thereby is not sufficient to prevent disengagement under extreme spreading conditions.

To positively limit radial inward swinging movements of the outer spreader arms 13, during spreading movement thereof so as to overcome the objectionable condition above described, I provide an elongated mounting head 21, preferably and as shown being tubular in form. Through the medium of a head-equipped bolt 22 extending through the annular inner end 23 of the head 21 and through a mounting plate 24 secured to the extreme outer end of the piston 2, said mounting head 21 is secured to and projects axially outwardly from said piston 2. Mounted for axial sliding movements on the head 21, between the inner end 23 and a stop collar 25 on the outer end thereof, is a stop element in the nature of a stepped collar 26. It will be noted that the collar 26 defines a plurality of axially spaced cylindrical surfaces 27, 28, 29 and 30 which are of progressively smaller diameter from the inner end to the outer end thereof, said cylindrical surfaces being concentric with the axis of the mounting head 21. Adapted to selectively engage circumferentially spaced portions of a given one of the cylindrical surfaces 27, 28, 29 and 30, are radially inwardly projecting lugs 31 carried by the outer spreader arms 13 which are inwardly spaced from the bead-engaging pads 14 thereof. Obviously, a given one of the cylindrical surfaces 27, 28, 29, 30 is selected depending upon the rim size of a given pneumatic tire casing being spread therein. For instance, if it is desired to spread a pneumatic tire casing 10 having a twelve inch rim receiving aperture defined by the beads thereof, then and in that event, the cylindrical surface 30 is placed immediately radially inwardly of the lugs 31. The collar 26 being slidably mounted on the mounting head 21 will maintain the frictional relationship between the lugs 31 and the cylindrical surface 30 during outward spreading movements of the spreader arms 13. The cylindrical surfaces 27, 28 and 29 represent other popular rim sizes such as sixteen, fifteen and fourteen inch rims. Fig. 1 shows the lugs 31 in engagement with the cylindrical surface 28, thereby indicating that the beads 9, 15 thereof define a rim receiving aperture of fifteen inches.

My invention has been thoroughly tested and found to be completely satisfactory for the accomplishment of the above objects and while I have shown a preferred embodiment thereof, I wish it to be specifically understood that same is capable of modification without departure from the scope and spirit of the appended claims.

What I claim is:

1. Improvements in pneumatic tire casing spreaders of the type including a cylinder, a piston working out of one end of said cylinder, circumferentially spaced radial arms carried by said cylinder and said piston respectively, bead engaging spreader arms pivotally secured at their inner ends to the outer ends of said radial arms for swinging movements of the outer ends of said spreader arms toward and away from the projected axis of said piston and cylinder and defining cooperating pairs of spreader arms, said improvements comprising an elongated mounting head operatively secured to the outer end of said piston and extending axially outwardly thereof, a stop element mounted on said head for axial sliding movements, said stop element having circumferentially spaced cooperating surface portions equi-distant from said projected axis and engageable with cooperating portions of the spreader arms carried by said piston to limit radially inward movement of said spreader arms when said stop element is positioned radially inwardly of said spreader arm portions.

2. The structure defined in claim 1 in which the cooperating portions of said spreader arms comprise radially inwardly projecting lugs carried by said spreader arms.

3. Improvements in pneumatic tire casing spreaders of the type including a cylinder, a piston working out of one end of said cylinder, circumferentially spaced radial arms carried by said cylinder and said piston respectively, bead engaging spreader arms pivotally secured at their inner ends to the outer ends of said radial arms for swinging movements of the outer ends of said spreader arms toward and away from the projected axis of said piston and cylinder and defining cooperating pairs of spreader arms, said improvements comprising an elongated mounting head operatively secured to the outer end of said piston and extending axially outwardly thereof, a stepped collar mounted on said head for axial sliding movements and defining a plurality of axially spaced cylindrical surfaces of progressively smaller diameter from one end to the other thereof and concentric with said axis, said piston carried spreader arms having radially inwardly projecting lugs selectively engageable with said cylindrical surfaces and limiting radially inward movement of said spreader arms when a given one of said surfaces is positioned radially inwardly of said lugs.

References Cited in the file of this patent

UNITED STATES PATENTS

| | | |
|---|---|---|
| 1,908,311 | Branick | May 9, 1933 |
| 2,778,414 | Oglesby | Jan. 22, 1957 |